United States Patent [19]

Yamazaki et al.

[11] Patent Number: 4,479,144
[45] Date of Patent: Oct. 23, 1984

[54] VIDEO PROJECTING APPARATUS

[75] Inventors: Shigeru Yamazaki; Yoshiaki Takano, both of Yokohama, Japan

[73] Assignee: Sony Corporation, Tokyo, Japan

[21] Appl. No.: 368,098

[22] Filed: Apr. 14, 1982

[30] Foreign Application Priority Data

May 1, 1981 [JP] Japan .................. 56-83646

[51] Int. Cl.³ .......................... H04N 5/64
[52] U.S. Cl. ..................... 358/60; 358/254
[58] Field of Search ............. 358/60, 64, 55, 231, 358/237, 250, 254, 255; 312/7.7 V, 21, 22, 224, 226, 227, 350; D14/77, 82, 83

[56] References Cited

U.S. PATENT DOCUMENTS

| | | | |
|---|---|---|---|
| 3,600,625 | 8/1968 | Tsuneta | 358/60 |
| 4,209,807 | 6/1980 | Arita | 358/237 |
| 4,245,256 | 1/1981 | Kokubo | 358/60 |
| 4,358,792 | 11/1982 | Domoleczny | 358/237 |

FOREIGN PATENT DOCUMENTS 97325  8/1979  Japan .................. 358/60

OTHER PUBLICATIONS

New Projection–Television Sets, by Itoga, et al., Mitsubishi Electronic Adv. (Japan) vol. 8, No. 6, (Jun. 1979), pp. 19–21.

Primary Examiner—Tommy P. Chin
Attorney, Agent, or Firm—Lewis H. Eslinger; Alvin Sinderbrand

[57]  ABSTRACT

A video projecting apparatus comprises a housing-like chassis which encases projecting lenses and cathode-ray tubes and is provided with a front portion having a movable reflecting mirror. With this video projecting apparatus, the reflecting mirror can be moved to an extended position for projection onto a screen and a contracted position in a front portion of the chassis by a driving mechanism attached to the reflecting mirror.

4 Claims, 6 Drawing Figures

VIDEO PROJECTING APPARATUS

BACKGROUND OF THE INVENTION

1. Field of the Invention

This invention relates to a video projecting apparatus, in which a reflecting mirror for projecting light emitted from cathode-ray tubes onto a screen can be automatically advanced from a front portion of a housing-like chassis constituting the apparatus and subsequently retreated into the front portion of the chassis.

2. Description of the Prior Art

Hitherto, video projecting apparatus, which project the video images of a television set onto a screen as an enlarged-scale video image, have been developed. However, a video projecting apparatus, with which a reflecting mirror can be forwardly moved under remote control from a front portion of a housing-like chassis which encases the projecting lenses and cathode-ray tubes, has not yet been developed. Concurrently, it is undesired to adopt a structure where a reflecting mirror is structurally extended and maintained from the chassis front, because this configuration would mean an increased size of the entire apparatus. Further, it is undesirable to adopt a structure where a reflecting mirror is taken out of the chassis by manual operation from the chassis front, since such an operation would be by its very nature cumbersome. Therefore, the development of a video projecting apparatus, with which a reflecting mirror can be extended under remote control from a front portion of a chassis at any desired time from a front portion of a chassis to a position which enables images from cathode-ray tubes to be projected onto a screen, has long been sought.

SUMMARY OF THE INVENTION

An object of the present invention is to provide a video projecting apparatus, with which a reflecting mirror is integrally configured at the front of a housing-like chassis and which can be moved for projection of images to a predetermined forward position from the chassis by a driving means and can also be retracted from this extended position to a predetermined position inside the chassis.

Another object of the present invention is to provide a video projecting apparatus, wherein a reflecting mirror can be moved to properly project images from a cathode ray tube onto a screen thereby satisfying a video optical system.

A further object of the present invention is to provide a video projecting apparatus, in which a coupling shaft connecting a pair of driving means is provided without need of providing any special additional space therefor.

DETAILED DESCRIPTION OF THE PREFERRED EMBODIMENTS

Figure 1:
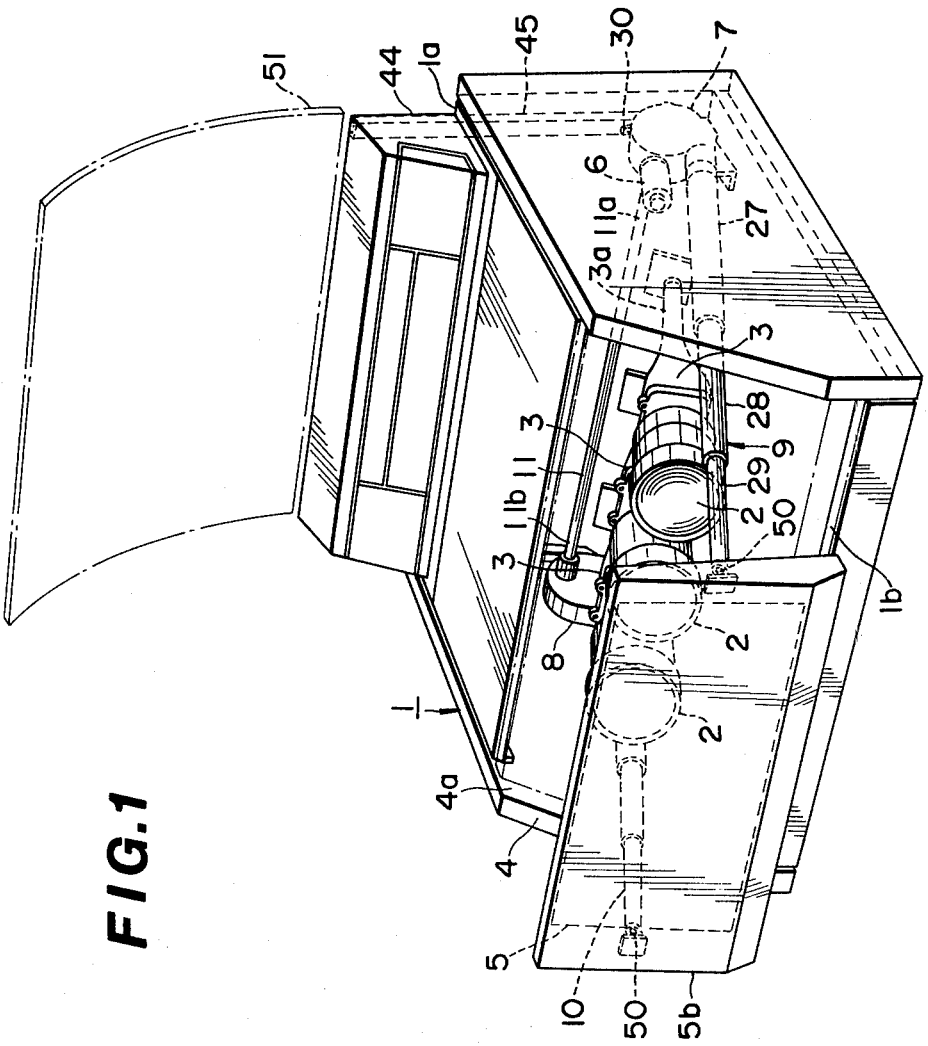
FIG. 1 is a perspective view showing one embodiment of the video projecting apparatus according to the present invention.

As shown in FIG. 1 is disclosed, a housing-like chassis 1 having a plurality of projecting lenses 2 and corresponding cathode-ray tubes 3, with a reflecting mirror 5 additionally provided at the front 4 of the chassis 1.

Inside the chassis 1 is provided a drive means 6 typically a drive motor as the drive source, first and second drive sections 7 and 8, driven simultaneously as a pair by the drive motor 6; extension-contraction mechanisms 9 and 10 also driven as a pair for the extension and retraction of the reflecting mirror 5 by the respective drive sections 7 and 8; and a coupling shaft 11 is provided between the rear ends 3a of the individual cathode-ray tubes 3 and the rear end 1a of the chassis 1a to connect the drive sections 7 and 8. The extension-contraction mechanisms 9 and 10 are synchronously driven as a pair for extension and retraction of the reflecting mirror by the coupling shaft 11 as driven by the drive sections 7 and 8.

Figure 2:
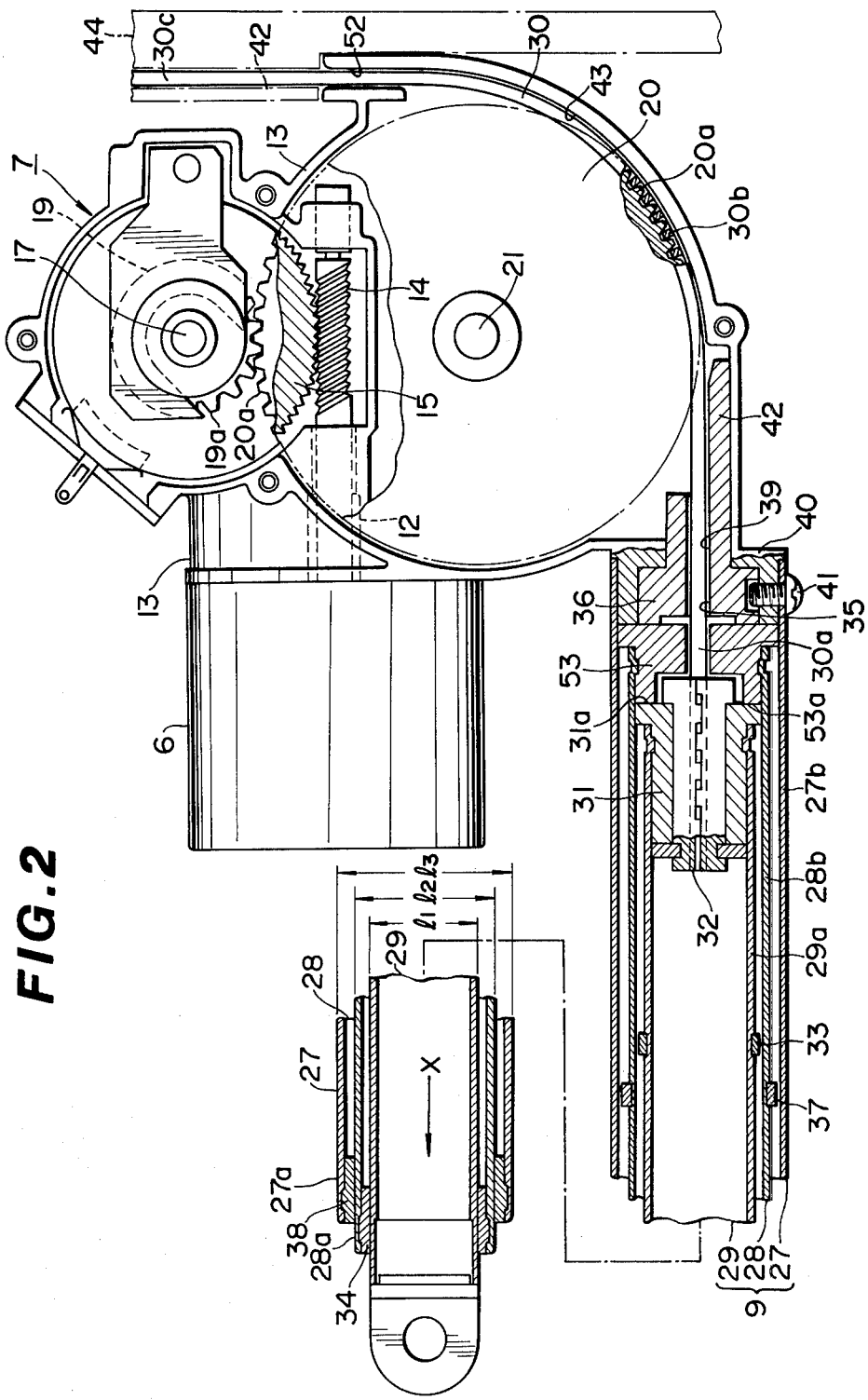
FIG. 2 is an enlarged-scale side view, partly broken away, showing the area of drive sections and the overall extension-contraction mechanisms.
Figure 3:
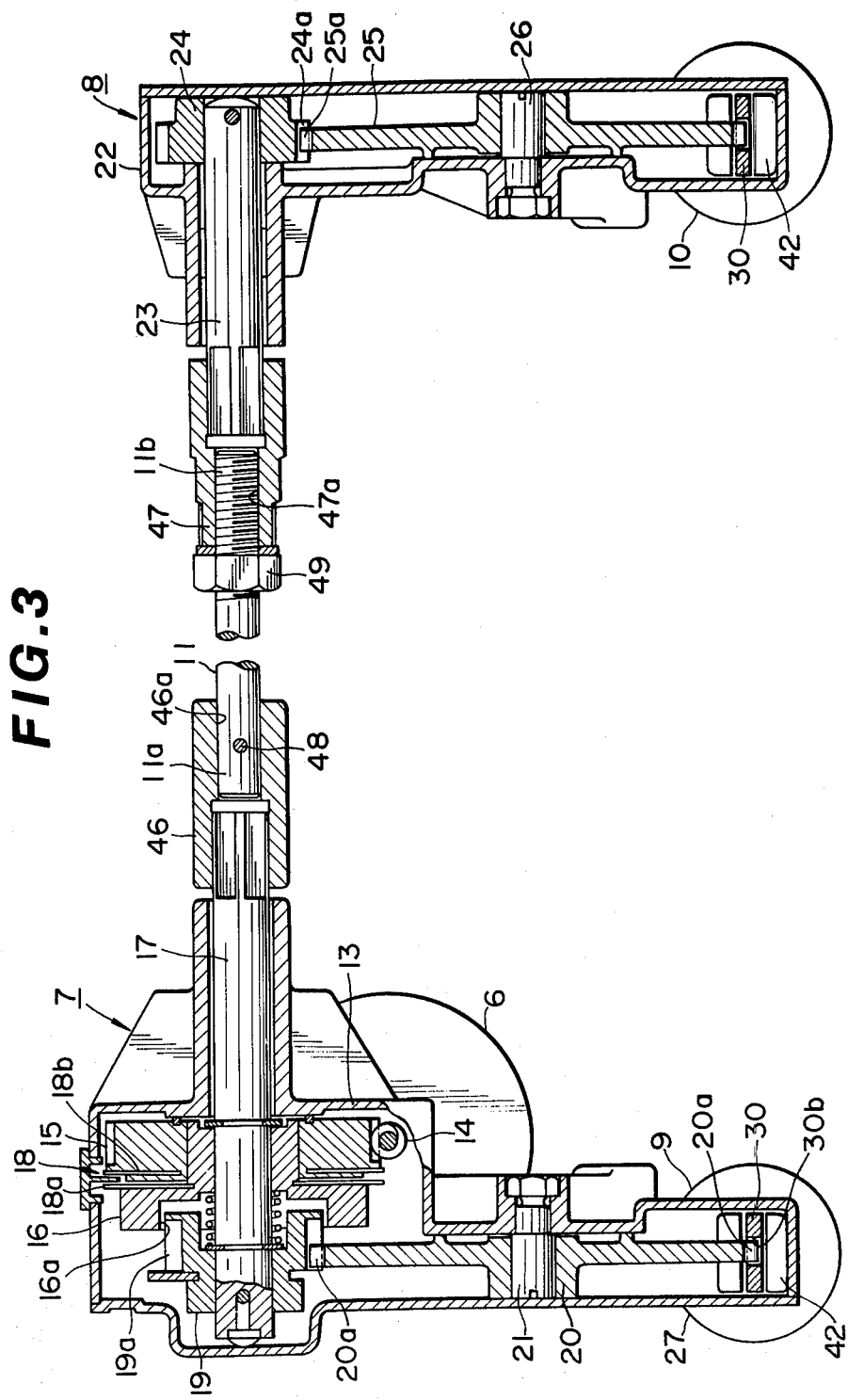
FIG. 3 is a sectional view, partly omitted, showing the connection of the individual drive sections to a coupling shaft.

The drive shaft 12 of the drive motor 6, as shown in FIGS. 2 and 3, has an integral worm gear 14 rotatably disposed inside an outer casing 13 which covers the drive section 7. The worm gear 14 is in mesh with a worm wheel 15. A disk-like clutch plate 16 is provided on the shaft 17 as is the wheel 15. The clutch plate 16 is secured to the shaft 17. The drive shaft 17 is rotatably supported inside the outer casing 13. Between the clutch plate 16 and worm wheel 15 there is provided an overload prevention mechanism 18 which serves to prevent an overload state from occurring when a load in excess of a predetermined value is applied. In the instant embodiment, at the time of normal driving, contact plates 18a and 18b, provided on the clutch plate 16 and worm wheel 15, respectively, are in contact. When a load in excess of a predetermined value is applied to the worm wheel 15 as mentioned above, the plates 18a and 18b are separated, thus disconnecting the power source from the drive motor 6.

A small gear 19 is also provided integral with the drive shaft 17, and a gear section 19a of the small gear 19 is in mesh with a gear section 20a of a large gear 20. The large gear 20 is rotatably supported in a shaft 21 secured to the outer casing 13.

On the side of the chassis 1 opposite the aforementioned first drive section 7 secured to the chassis 1, the second drive section 8 driven by the drive motor 6 is secured to the chassis 1. The second drive section 8 has the same construction as the first drive section 7 except that the worm gear 14 driven for rotation by the drive motor 6, worm wheel 15, overload prevention mechanism 18, and clutch plate 16, are not provided. More particularly, a drive shaft 23 rotatably supported inside the outer casing 22 of the second drive section 8 is provided with an integral small gear 24, and a gear section 24a of the small gear 24 is in mesh with a gear section 25a of a large gear 25. The large gear 25 is rotatably supported on a shaft 26 secured to the outer casing 22.

The pair of extension-contraction mechanisms 9 and 10 provided and connected in parallel relationship between the first and second drive sections 7 and 8 on one hand and the reflecting mirror 5 on the other hand, each consist of first, second and third extensible pipes 27, 28 and 29 consisting of, respectively large, medium and small cylinders in this embodiment. Of the extensible pipes 27, 28 and 29, a driving strip 30 extends through the second and third extensible pipes 28 and 29 such that it can be driven for running through the second and third extensible pipes 28 and 29 with the rotation of the large gear 20 for each of the drive sections 7 and 8.

The tip of the third extensible pipe 29 is coupled to a reflector cover 5b covering the reflecting mirror 5 via a hinge mechanism to be described later. The extensible pipe 29 has a stem as a cylindrical section 29a, in which a cylindrical bush 31 is fitted and secured thereto as shown in FIG. 2. A coupling member 32 for integrally coupling the end 30a of the aforementioned driving strip 30 and the extensible pipe 29 is provided inside the bush 31.

The second extensible pipe 28, the diameter $l_2$ of which is slightly greater than the diameter $l_1$ of the third extensible pipe 29, has a tip cylindrical section 28a, and an annular stopper member 34 is fitted in and secured to the cylindrical section 28a of the second extensible pipe 28 such that it is urged in the direction of arrow X in FIG. 2 by a push ring 33 fitted on the outer periphery of an intermediate portion of the third extensible pipe 29. The second extensible pipe 28 has a stem as a cylindrical section 28b, wherein a disk-like bush 36 is secured, the bush 36 has a bore 35 through which the driving strip 30 mentioned above is inserted.

The first extensible pipe 27, which has a diameter $l_3$ slightly greater than the diameter $l_2$ of the second extensible pipe 28, has a tip portion as a cylindrical section 27a, in which is securely fitted an annular stopper member 38 urged in the direction of arrow X in FIG. 2 by a push ring 37 fitted on the outer periphery of an intermediate portion of the second extensible pipe 28. The first extensible pipe 27 has a stem as a cylindrical section 27b, in which a cylindrical member 40 having a lead opening 39 through which the driving strip 30 of the first drive section 7 is led out is secured by a set screw 41 to the cylindrical section 27b. A guide member 42 for guiding the driving strip 30 is provided inside the lead opening 39.

The driving strip 30 has a sufficient length to extend the extensible pipes 27, 28 and 29 to a desired position. An insertion hole 30b in which the gear section 20a of the aforementioned large gear 20 can engage is provided in the longitudinal direction of the driving strip such that its diametrical dimension corresponds to the gear section 20a. The driving strip 30 is driven along a strip path 43 formed arcularly as part of the outer periphery of the large gear 20, and its other end can be withdrawn along a guide 45 provided on an upright portion 44 of the chassis 1 in proximity to the upper end of the chassis 1.

The extension-contraction mechanism 10 which has the same construction as the aforementioned extension-contraction mechanism 9 is positioned between the second drive section 8 and reflecting mirror 5.

The opposite ends 11a and 11b of the coupling shaft 11 for coupling the pair drive sections 7 and 8, as shown in FIG. 3, are provided with respective integral sleeves 46 and 47. One end 11a of the coupling shaft 11 is fitted in and secured by means of a screw 48 to a see-through hole 46a of the sleeve 46, and the other end 11b of the coupling shaft 11 is fitted in the see-through hole 47a of the other sleeve 47, with the two being secured to each other by a nut 49.

The operation of the embodiment will now be described. The operation will first be described in connection with the case of forwardly projecting the reflecting mirror 5 from the front 4 of the chassis 1.

First, the drive motor 6, which can be controlled by remote control is activated. The rotational driving force of the drive motor 6 is transmitted by the rotational drive shaft 12, worm gear 14 which is integral with the drive shaft 12, worm wheel 15 in mesh with the worm gear 14, overload prevention mechanism 18, which includes clutch plate 16, and projection 16a formed on one side of the clutch plate 16, small gear 19 in mesh with the recess 16a, and the large gear 20 which is in turn in mesh with the small gear 19 in the mentioned order to cause rotation of the large gear 20 at a predetermined speed. With the rotation of the large gear 20 thus caused, the driving strip 30 which is in mesh with the gear section 20a of the large gear 20 is led off through the lead opening 39 of the first drive section 7.

Meanwhile, the rotational driving force transmitted from the small gear 19 is transmitted through the drive shaft 17 to which the small gear 19 is secured, sleeve 46, coupling shaft 11 and sleeve 47 in the mentioned order to the drive shaft 23 of the second drive section 8. Since this rotational driving force is transmitted through the small gear 24 integral with the drive shaft 23 and the large gear 25 in mesh with the small gear 24, the large gear 25 is rotated at the same speed as the large gear 20 in the first drive section 7 mentioned above. Thus, the other driving strip 30 which is in mesh with the gear section 25a of the large gear 25 is led off from a lead opening (not shown) of the second drive section 8 in synchronism to the first mentioned driving strip 30.

Figure 4:
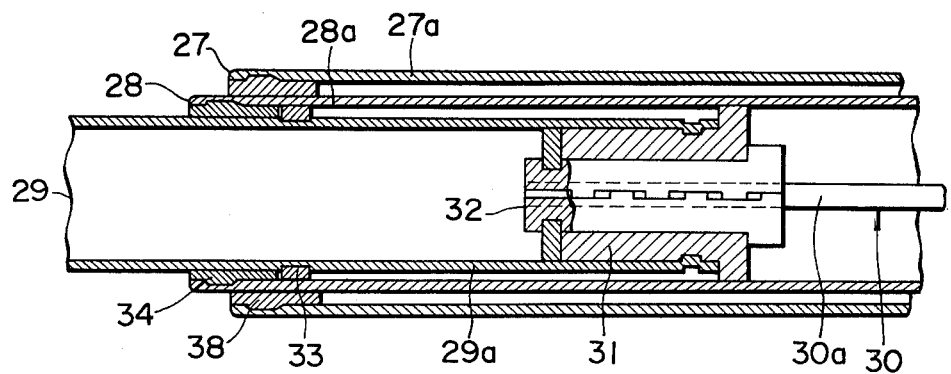
FIG. 4 is a fragmentary sectional view showing the extensible pipes of the extension-contraction mechanism with the third extensible pipe being in a state of extension.

As the pair of driving strips 30 are led off through the respective lead openings 39 in synchronism to one another, the third extensible pipes 29, to which the tips 30a of the driving strips 30 are secured by coupling members 32, are pushed out along the inner peripheral surfaces of the second extensible pipes 28. The third extensible pipe 29 is pushed out until the push ring 33 fitted on the outer periphery of the pipe 29 is brought into contact with the stopper member 34 secured to the tip of the second extensible pipe 28 as shown in FIG. 4. Consequently, the stopper 34 is pushed, so that the second extensible pipe 28 is pushed forwards along the inner periphery of the first extensible pipe 27. The second extensible pipe 28 is pushed out along the inner periphery of the first extensible pipe 27 until the push ring 37 fitted on the outer periphery of the pipe 28 comes to engage the stopper member 38 secured to the tip of the first extensible pipe 27. Thus, the reflector cover 5b, having the reflecting mirror 5 accommodated in the opening 4a formed at the front 4 of the chassis 1 such as to cover the front of the projecting lenses 2, is forwardly projected by the pair extension-contraction mechanisms 9 and 10 as shown in FIG. 1. During this movement, the hinge mechanisms 50 provided between the reflector cover 5b and the tips of the third extension pipes 29 function to adjust the mounting position of the reflecting mirror 5 such as to satisfy the light projection optical system, wherein light emitted from the cathode-ray tubes 3 is projected through the projecting lenses 2 onto the reflecting mirror 5 and reflected onto a screen 51, and the mounting position of the reflecting mirror is fixed by stopper sections provided in the neighborhood of the hinge mechanisms 50. Thus, the reflecting mirror 5 is held stationary at a position which satisfies the aforementioned light projection optical system.

Now, the operation of moving the reflecting mirror 5 from the position shown in FIG. 1 into a retracted position as shown by dashed lines in FIG. 1 will be described.

In this case, the drive motor 6 is driven in the opposite direction relative to the direction described in the previous operation. The rotational driving force of the drive motor 6 is thus transmitted through the rotational drive shaft 12, worm gear 14 integral with the drive shaft 12, worm wheel 15 in mesh with the worm gear 14, overload prevention mechanism 18, clutch plate 15, small gear 19 in mesh with recesses 16a formed on one side of the clutch plate 16, and large gear 20 in mesh with the small gear 19 in the mentioned order to cause opposite rotation of the large gear 20 at a predetermined speed. With the rotation of the large gear 20 the driving strip 30 in mesh with the gear section 20a of the large gear 20 is pulled and moved toward the upper end of the chassis 1 through the lead opening 39 of the first drive section 7, opening 52 and along guide member 45.

The rotational driving force transmitted from the drive motor 6 to the small gear 19 is also transmitted through the drive shaft 17 secured to the small gear 19, sleeve 46, coupling shaft 11 and sleeve 47 to the drive shaft 23 of the second drive section 8. Since this rotational driving force is further transmitted through the small gear 24 integral with the drive shaft 23 and the large gear 25 in mesh with the drive shaft 23, the large gear 25 is rotated in synchronism with and at the same speed as the large gear 20 in the first drive section 7 mentioned above. Thus, the other driving strip 30 in mesh with the gear section 25a of the large gear 25 is pulled through an opening (not shown) of the second drive section 8 in synchronism to the first-mentioned driving strip 30.

As the pair driving strips 30 are pulled through the respective openings 52 in synchronism to each other, the third extensible pipes 29, to which the tips of the driving strips are secured via the coupling members 32, are pushed into the stem of the second extensible pipes 28 along the inner periphery thereof. The third extensible pipe 29 is retracted until the lower end 31a of the bush 31 fitted in the stem of the pipe 29 strikes the upper end 53a of the bush 53 secured to the stem of the second extensible pipe 28. Consequently, the bush 53 is urged, and the second extensible pipe 28 is retracted to the stem of the first extensible pipe 27 along the inner periphery thereof until it is stopped at a position in the neighborhood of the lead openings 39 of the drive sections 7 and 8. Thus, the reflector cover 5b having the reflecting mirror 5 is retracted to its original position, in the opening 4a formed at the front 4 of the chassis 1 by the pair of extension-contraction means 9 and 10 as shown by the dashed lines in FIG. 1.

When the reflector cover 5b is retracted into the opening 4a, the lower edge of the cover 5b is brought into contact with the bottom 1b of the chassis 1, and its upper edge opposite the lower edge is turned about the hinge mechanisms 50 due to the continued movement of the contraction means toward the chassis 1. Thus, the reflector cover 5b is held and securely positioned in the opening 4a such as to cover the front portions of the reflecting lenses 2.

While the above description was concerned with the case where the reflecting mirror 5 is automatically moved forward from the front 4 of the chassis 1 and also in the reverse direction toward the front 4 of the chassis 1 by the driving force of the drive motor 6, the same operation can be manually caused as will be described hereinafter with reference to FIGS. 5 and 6.

Figure 5:
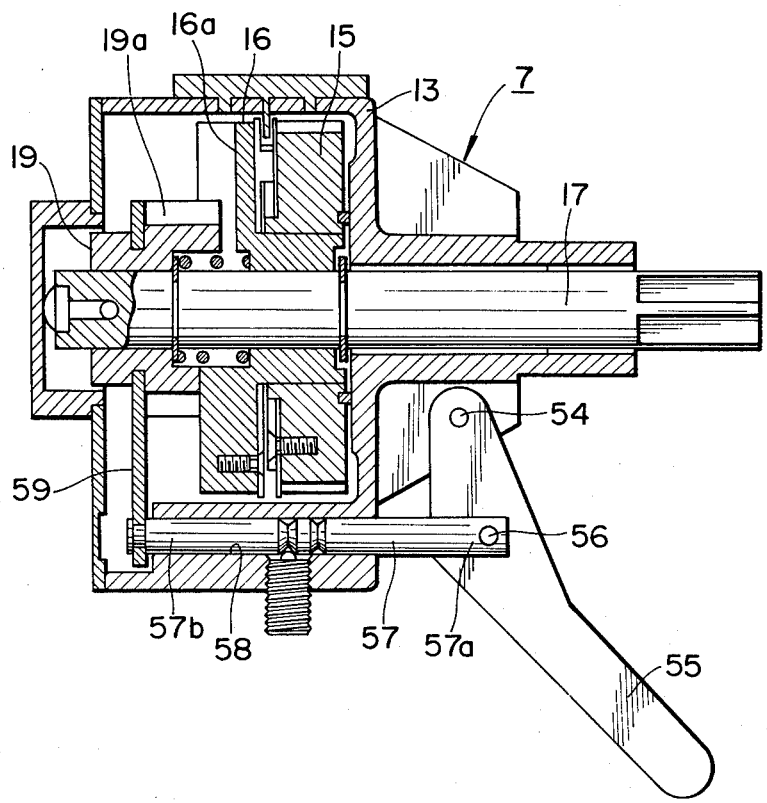
FIG. 5 is a longitudinal sectional view showing a drive section prior to the turning of the manual operating lever.
Figure 6:
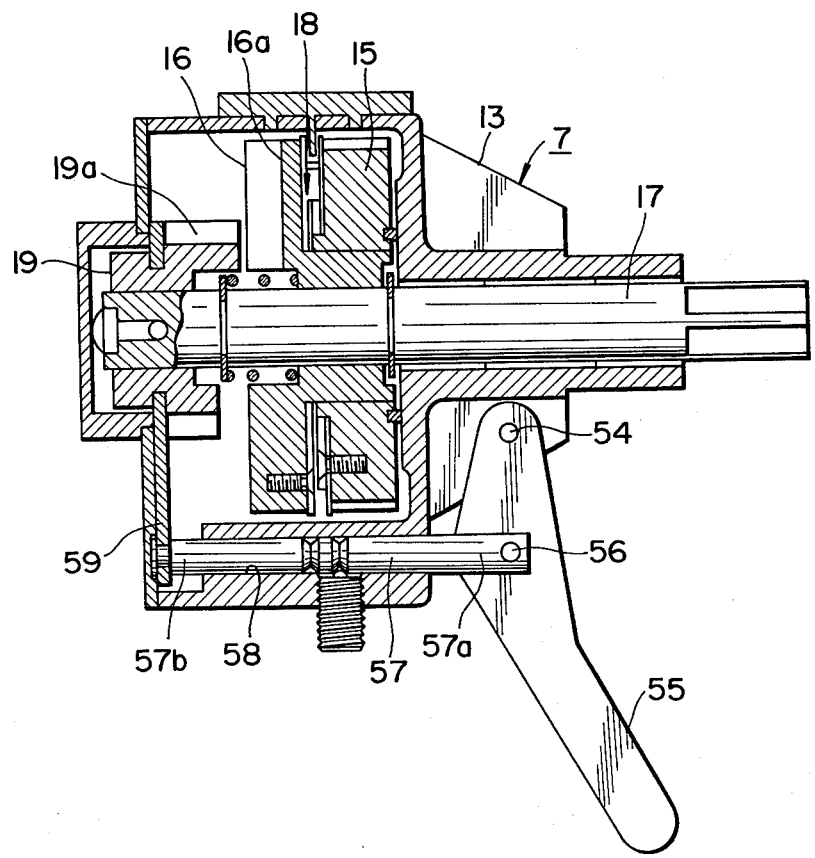
FIG. 6 is a longitudinal sectional view showing a drive section after the turning of the manual operating lever.

An operating lever 55 which is rotatably mounted on the outer casing 13 of the first drive section 7 via a pivotal pin 54 is rotated in the clockwise direction in FIG. 5. As a result, one end 57b of an urging rod 57, the other end 57a of which is mounted on the aforementioned operating lever 55 via a pin 56, projects in the leftward direction in the Figure along a bore 58 formed in the outer casing 13. Thus, a manual plate 59 secured to the end 57b of the urging rod 57 and the aforementioned small gear 19, in which the manual plate 59 is mounted, are both moved in the longitudinal direction of the drive shaft 17. Consequently, a recess 19a formed on the outer periphery of the small gear 19 is detached from a projection 16a formed on one side of the clutch plate 16. Thus, the small gear 19 and clutch plate 16 are separated from each other, and by rotating the manual plate 59 in a predetermined direction in this state, the drive shaft 17, small gear 19 and large gear 16 can be rotated to manually operate the reflecting mirror 5 in a predetermined direction via the pair extension-contraction mechanisms 9 and 10 as outlined above.

As has been made apparent from the foregoing, a video projecting apparatus according to the present invention, in which projecting lenses and cathode-ray tubes are disposed inside a housing-like chassis and a reflecting mirror is mounted at the front of the chassis, and also which comprises a drive source, a first and second driving means which are driven as a pair by the drive source, and a pair of extension-contraction mechanisms in parallel relationship, each driven by respective drive sections and connected to the reflecting mirror so as to move the mirror has been provided. The chassis has further been provided with a coupling shaft disposed between the rear ends of the cathode-ray tubes and the rear end of the chassis to synchronously attach the drive sections to each other, with the pair extension-contraction mechanisms being so driven. By such an apparatus the coupling shaft driven by the driving forces of the drive sections, can in turn move the reflecting mirror automatically or manually into either a predetermined extended or retracted position. Thus the intended aim and clear improvement over the prior art, can be readily attained.

Further, since the pair extension-contraction mechanisms are driven for extension and contraction in synchronism to each other, it is further possible to move the reflecting mirror while maintaining the correct position for reflecting images in the video optical system.

Further, since the coupling shaft is provided between the rear end of the cathode-ray tubes and the rear end of the chassis, there is no need of providing any particular additional space for its position, and this contributes to the size reduction of the entire apparatus.

What is claimed is:

1. A video projecting apparatus comprising:
   a housing-like chassis having front and rear portions, said chassis further having projection lenses and cathode ray tubes disposed therein for the projection of visual images from said tubes through said lenses;

a reflecting mirror having an inactive position at said front portion of said chassis;

a drive motor positioned within said chassis;

means for selectively actuating said drive motor in an extension direction and a contraction direction;

moving means positioned substantially within said chassis for moving said reflecting mirror relative to said chassis between said inactive position at said front portion of said chassis and an active position remote from and in front of said front portion of said chassis, said moving means including first and second drive sections driven by said drive motor, and first and second extension-contraction mechanisms disposed in parallel within said chassis and extending between said front and rear portions of said chassis, said first and second extension-contraction mechanisms being drivingly connected to said first and second drive sections, respectively, said reflecting mirror being affixed, at opposite sides thereof, to front portions of said first and second extension-contraction mechanisms, respectively, said drive sections moving said front portions of said extension-contraction mechanisms forwardly relative to said chassis when said drive motor is actuated in said extension direction;

said reflecting mirror being positioned in said active position by said moving means when said drive motor is actuated in said extension direction, and said reflecting mirror being returned to said inactive position by said moving means when said drive motor is actuated in said contraction direction; and means for manually actuating said drive section, said means for manually actuating said drive sections including a rotatable operating lever, said lever being coupled with a drive shaft engaging said drive sections.

2. A video projecting apparatus comprising:

a housing-like chassis having front and rear portions, said chassis further having projection lenses and cathode ray tubes disposed therein for the projection of visual images from said tubes through said lenses;

a reflecting mirror having an inactive position at said front portion of said chassis;

a drive motor positioned within said chassis;

means for selectively actuating said drive motor in an extension direction and a contraction direction;

moving means positioned substantially within said chassis for moving said reflecting mirror relative to said chassis between said inactive position at said front portion of said chassis and an active position remote from and in front of said front portion of said chassis, said moving means including first and second drive sections driven by said drive motor, and first and second extension-contraction mechanisms disposed in parallel within said chassis and extending between said front and rear portions of said chassis, said first and second extension-contraction mechanisms being drivingly connected to said first and second drive sections, respectively, said reflecting mirror being affixed, at opposite sides thereof, to front portions of said first and second extension-contraction mechanisms, respectively, said drive sections moving said front portions of said extension-contraction mechanisms forwardly relative to said chassis when said drive motor is actuated in said extension direction;

said reflecting mirror being positioned in said active position by said moving means when said drive motor is actuated in said extension direction, and said reflecting mirror being returned to said inactive position by said moving means when said drive motor is actuated in said contraction direction;

means connecting said drive motor to said first drive section for driving the latter; and coupling means affixed between said first and second drive sections for transmitting driving force from said first drive section to said second drive section so that said first and second drive sections are driven in synchronism for synchronously moving said front portions of said first and second extension-contraction mechanisms.

3. A video projecting apparatus comprising:

a housing-like chassis having front and rear portions, said chassis further having projection lenses and cathode ray tubes disposed therein for the projection of visual images from said tubes through said lenses;

a reflecting mirror having an inactive position at said front portion of said chassis;

a drive motor positioned within said chassis;

means for selectively actuating said drive motor in an extension direction and a contraction direction;

moving means positioned substantially within said chassis for moving said reflecting mirror relative to said chassis between said inactive position at said front portion of said chassis and an active position remote from and in front of said front portion of said chassis, said moving means including first and second drive sections driven by said drive motor, and first and second extension-contraction mechanisms disposed in parallel within said chassis and extending between said front and rear portions of said chassis, each of said extension-contraction mechanisms including a plurality of coaxial, telescopically arranged cylinders, a drive strip extending longitudinally in said cylinders and connected with a respective one of said first and second drive sections, said drive strip being connected at one end to one of said cylinders which are in driving relationship with each other for extending and contracting said cylinders relative to each other in response to movements of said drive strip in opposite longitudinal directions, respectively;

said reflecting mirror being affixed, at opposite sides thereof, to front portions of said first and second extension-contraction mechanisms, respectively, said drive sections moving said front portions of said extension-contraction mechanisms forwardly relative to said chassis when said drive motor is actuated in said extension direction;

said reflecting mirror being positioned in said active position by said moving means when said drive motor is actuated in said extension direction, and said reflecting mirror being returned to said inactive position by said moving means when said drive motor is actuated in said contraction direction.

4. A video projecting apparatus according to claim 3, wherein:

each of said first and second drive sections includes a series of meshing gears including a driven gear which engages said drive strip of the respective extension-contraction mechanism, and said coupling means includes a coupling shaft transmitting driving force from one gear of said first drive section to a corresponding gear of said second drive section.

* * * * *